(12) United States Patent
Tang et al.

(10) Patent No.: US 6,693,522 B2
(45) Date of Patent: Feb. 17, 2004

(54) SYSTEM AND METHOD FOR TIRE PRESSURE MONITORING INCLUDING AUTOMATIC TIRE LOCATION RECOGNITION

(75) Inventors: Qingfeng Tang, Novi, MI (US); John S. Nantz, Brighton, MI (US); Riad Ghabra, Dearborn Heights, MI (US); Salman Khreizat, Dearborn, MI (US); Ronald O. King, Brownstown, MI (US); David Kosokowsky, Lake Oswego, OR (US)

(73) Assignee: Lear Corporation, Southfield, MI (US)

( * ) Notice: Subject to any disclaimer, the term of this patent is extended or adjusted under 35 U.S.C. 154(b) by 115 days.

(21) Appl. No.: 09/977,150

(22) Filed: Oct. 12, 2001

(65) Prior Publication Data

US 2003/0071723 A1 Apr. 17, 2003

(51) Int. Cl.[7] ................................................. B60C 1/00
(52) U.S. Cl. ..................... 340/445; 340/442; 340/447
(58) Field of Search ................................. 340/447, 438, 340/442, 445; 73/146, 146.2

(56) References Cited

U.S. PATENT DOCUMENTS

| | | |
|---|---|---|
| 3,580,353 A | 5/1971 | Thompson |
| 3,916,688 A | 11/1975 | Dendy et al. |
| 4,067,235 A | 1/1978 | Markland et al. |
| 4,101,870 A | 7/1978 | Ekman |
| 4,330,774 A | 5/1982 | Doty |
| 4,450,431 A | 5/1984 | Hochstein |
| 4,468,650 A | 8/1984 | Barbee |
| 4,660,528 A | 4/1987 | Buck |
| 4,670,845 A | 6/1987 | Etoh |
| 4,717,905 A | 1/1988 | Morrison, Jr. et al. |
| 4,749,993 A | 6/1988 | Szabo et al. |
| 4,951,208 A | 8/1990 | Etoh |
| 5,040,561 A | 8/1991 | Achterholt |
| 5,109,213 A | 4/1992 | Williams |
| 5,156,230 A | 10/1992 | Washburn |
| 5,165,497 A | 11/1992 | Chi |
| 5,289,160 A | 2/1994 | Fiorletta |
| 5,444,448 A | 8/1995 | Schuermann et al. |
| 5,451,959 A | 9/1995 | Schuermann |
| 5,461,385 A | 10/1995 | Armstrong |
| 5,463,374 A | 10/1995 | Mendez et al. |
| 5,473,938 A | 12/1995 | Handfield et al. |
| 5,479,171 A | 12/1995 | Schuermann |
| 5,483,827 A | 1/1996 | Kulka et al. |
| 5,485,381 A | 1/1996 | Heintz et al. |
| 5,500,637 A | 3/1996 | Kokubu |
| 5,562,787 A | 10/1996 | Koch et al. |
| 5,573,610 A | 11/1996 | Koch et al. |
| 5,573,611 A | 11/1996 | Koch et al. |
| 5,585,554 A | 12/1996 | Handfield et al. |
| 5,600,301 A  * | 2/1997 | Robinson, III .............. 340/442 |
| 5,602,524 A | 2/1997 | Mock et al. |
| 5,654,689 A | 8/1997 | Peyre et al. |
| 5,661,651 A | 8/1997 | Geschke et al. |
| 5,670,933 A | 9/1997 | Hayashi |

(List continued on next page.)

*Primary Examiner*—Toan Pham
(74) *Attorney, Agent, or Firm*—Bill C. Panagos

(57) ABSTRACT

A system and method for monitoring vehicle tire pressure. A tire pressure monitor for each tire includes a pressure sensor for sensing tire pressure and a transmitter for transmitting a tire pressure signal representative of the sensed tire pressure. A receiver for mounting on the vehicle receives the tire pressure signals, and includes an antenna to be located at a vehicle site. Each tire pressure signal has an amplitude and, for each tire location, the amplitude has a unique pattern over time for the antenna site. A controller for mounting on the vehicle communicates with the receiver and collects and processes the tire pressure signals to automatically identify the tire location associated with each tire pressure signal based on the unique amplitude patterns. The controller further generates control signals for use in conveying tire pressure and location information to a vehicle occupant.

20 Claims, 2 Drawing Sheets

U.S. PATENT DOCUMENTS

| | | |
|---|---|---|
| 5,677,667 A | 10/1997 | Lesesky |
| 5,705,746 A | 1/1998 | Trost et al. |
| 5,717,376 A | 2/1998 | Wilson |
| 5,724,028 A | 3/1998 | Prokup |
| 5,728,933 A | 3/1998 | Schultz et al. |
| 5,740,548 A | 4/1998 | Hudgens |
| 5,741,966 A | 4/1998 | Handfield et al. |
| 5,753,809 A | 5/1998 | Ogusu et al. |
| 5,760,682 A | 6/1998 | Liu et al. |
| 5,774,047 A | 6/1998 | Hensel, IV |
| 5,783,992 A | 7/1998 | Eberwine et al. |
| 5,822,683 A | 10/1998 | Paschen |
| 5,835,868 A | 11/1998 | McElroy et al. |
| 5,838,229 A | 11/1998 | Robinson, III |
| 5,844,130 A | 12/1998 | Hilgart et al. |
| 5,853,020 A | 12/1998 | Widner |
| 5,880,363 A | 3/1999 | Meyer et al. |
| 5,900,808 A | 5/1999 | Lebo |
| 5,926,087 A | 7/1999 | Busch et al. |
| 5,939,977 A | 8/1999 | Monson |
| 5,942,971 A | 8/1999 | Fauci et al. |
| 5,959,365 A | 9/1999 | Mantini et al. |
| 5,963,128 A * | 10/1999 | McClelland ................ 340/447 |
| 5,999,091 A | 12/1999 | Wortham |
| 6,002,327 A | 12/1999 | Boesch et al. |
| 6,025,777 A | 2/2000 | Fuller et al. |
| 6,034,596 A | 3/2000 | Smith et al. |
| 6,034,597 A | 3/2000 | Normann et al. |
| 6,043,738 A * | 3/2000 | Stewart et al. .............. 340/447 |
| 6,043,752 A | 3/2000 | Hisada et al. |
| 6,053,038 A | 4/2000 | Schramm et al. |
| 6,060,984 A | 5/2000 | Braun et al. |
| 6,087,930 A | 7/2000 | Kulka et al. |
| 6,111,520 A | 8/2000 | Allen et al. |
| 6,112,587 A | 9/2000 | Oldenettel |
| 6,118,369 A | 9/2000 | Boesch |
| 6,127,939 A | 10/2000 | Lesesky et al. |
| 6,169,480 B1 | 1/2001 | Uhl et al. |
| 6,175,302 B1 | 1/2001 | Huang |
| 6,181,241 B1 | 1/2001 | Normann et al. |
| 6,204,758 B1 | 3/2001 | Wacker et al. |
| 6,232,875 B1 * | 5/2001 | DeZorzi ..................... 340/442 |
| 6,232,884 B1 | 5/2001 | Gabbard |
| 6,243,007 B1 | 6/2001 | McLaughlin et al. |
| 6,246,317 B1 | 6/2001 | Pickornik et al. |
| 6,252,498 B1 | 6/2001 | Pashayan, Jr. |
| 6,255,940 B1 | 7/2001 | Phelan et al. |
| 6,259,361 B1 | 7/2001 | Robillard et al. |
| 6,259,362 B1 | 7/2001 | Lin |
| 6,275,148 B1 | 8/2001 | Takamura et al. |
| 6,278,363 B1 * | 8/2001 | Bezek et al. ................ 340/442 |
| 6,304,610 B1 | 10/2001 | Monson |
| 6,340,929 B1 | 1/2002 | Katou et al. |
| 6,408,690 B1 * | 6/2002 | Young et al. .............. 73/146.5 |
| 6,417,766 B1 * | 7/2002 | Starkey ..................... 340/447 |
| 6,501,372 B2 * | 12/2002 | Lin ........................... 340/442 |
| 2001/0008083 A1 | 7/2001 | Brown |

* cited by examiner

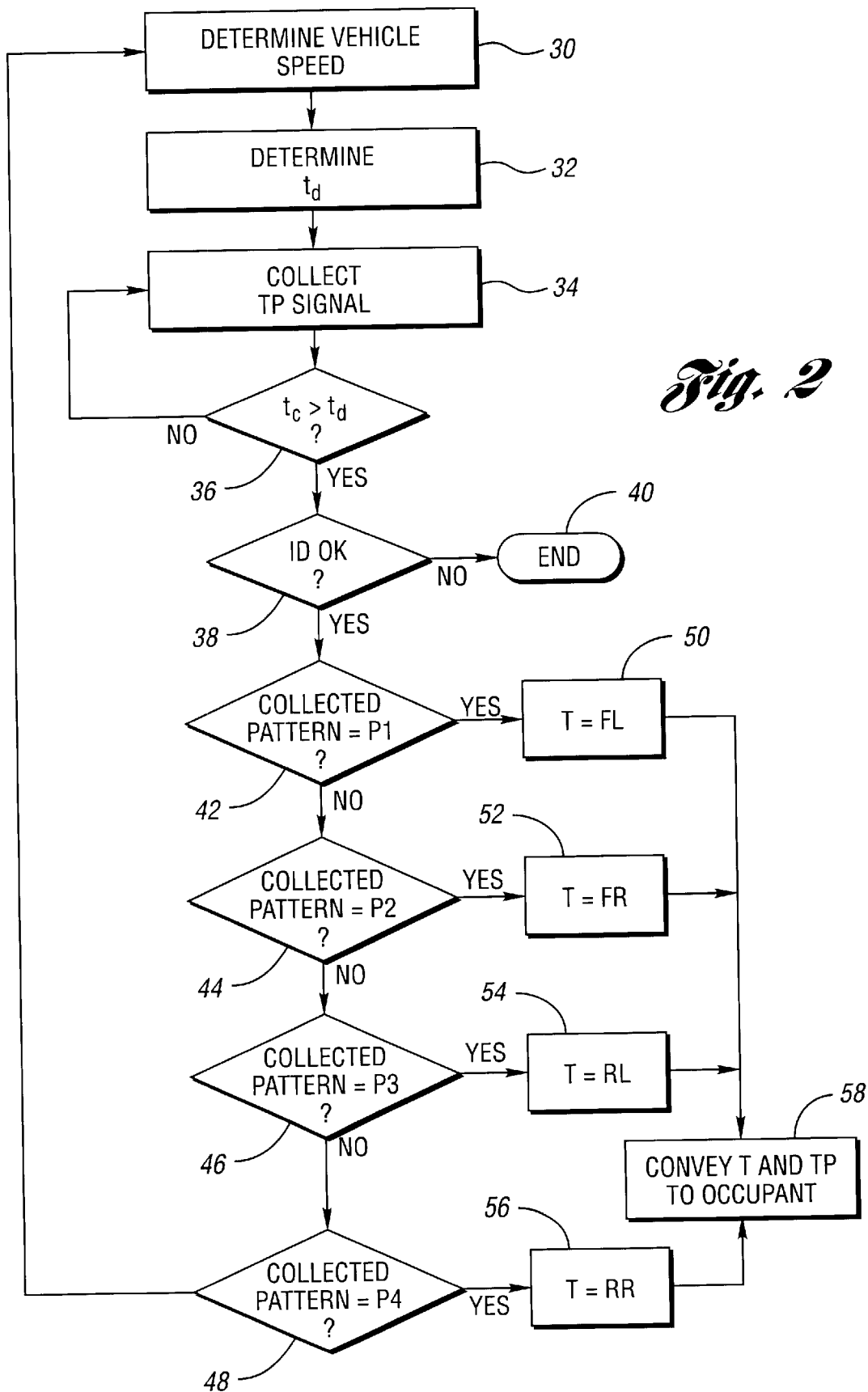

SYSTEM AND METHOD FOR TIRE PRESSURE MONITORING INCLUDING AUTOMATIC TIRE LOCATION RECOGNITION

TECHNICAL FIELD

The present invention relates generally to wireless vehicle tire pressure monitoring and, more particularly, to a system and method for wireless vehicle tire pressure monitoring that includes automatic recognition of tire location.

BACKGROUND ART

It is known in the automotive industry to provide for wireless monitoring of vehicle tire parameters, particularly tire pressure. In such tire pressure monitoring systems, tire pressure sensors and radio frequency (RF) transmitters are mounted inside each tire, typically adjacent the inflation valve stem. In each tire, the tire pressure sensed by the tire pressure sensor is transmitted by the transmitter to a receiver located on-board the vehicle. The tire pressure information delivered to the receiver by the RF signals from the transmitters is subsequently conveyed to a vehicle operator or occupant, typically in the form of a display.

Exemplary tire pressure monitoring systems are described and shown in U.S. Pat. Nos. 6,112,587 and 6,034,597. Conventional tire pressure monitoring systems, however, are not capable of automatically recognizing the particular tire location (e.g., front left (FL), front right (FR), rear left (RL), rear right (RR)) associated with an RF signal received from a tire transmitter without the use of additional equipment or devices. That is, in conventional tire pressure monitoring systems, in order to provide a vehicle operator with information specific to each vehicle tire, an initialization or sign-up operation must be undertaken by a technician or vehicle owner to program the system so that each RF signal from a tire transmitter will be associated with a particular tire location.

Such operation, however, can create problems when tires are subsequently rotated or changed from their initial locations to new locations. Each time the vehicle tires are rotated, initialization or sign-up must be repeated to ensure that the system continues to operate properly by conveying accurate information, including tire location, to the vehicle operator. This initialization requirement makes tire rotation more complex, and increases the possibility of inaccurate operation of the system. These problems can be overcome through the use of additional equipment or devices, as previously mentioned, for use in determining tire locations. For example, multiple antenna, each associated with a particular tire, and/or specialized transmitters may be employed. Such additional equipment or devices, however, can add significant cost to a tire pressure monitoring system.

Thus, there exists a need for a smart or adaptive tire pressure monitoring system and method that automatically recognizes tire location even after tire rotation, without the need for subsequent initialization or sign-up operations, or additional equipment or devices. In that regard, the amplitude and pattern of an RF tire pressure signal transmitted from a rotating tire typically vary during transmission. Such a smart tire pressure monitoring system and method would use signal amplitude over time from RF tire transmitters as a signature for each tire location. Such a system and method would preferably include a receiver optimally located on the vehicle, as well as a microcontroller or digital signal processor (DSP) for collecting amplitude versus time data from each tire transmitter and processing such data using pattern recognition techniques to determine the tire location from where the data was transmitted. Advantageously, tire pressure sensor identification codes and such a location signature could be combined to provide the vehicle operator with tire location information.

SUMMARY OF THE INVENTION

Accordingly, the present invention provides an improved vehicle tire pressure monitoring system and method. More particularly, the present invention provides, in a vehicle having a plurality of tires, each tire having a tire location associated therewith, a system for monitoring tire pressure. The system comprises a plurality of tire pressure monitors, each monitor for mounting in one of the plurality of tires, each monitor comprising means for determining tire pressure and a transmitter for transmitting a tire pressure signal representative of the tire pressure determined. The system further comprises a receiver for mounting on board the vehicle for receiving the tire pressure signals, the receiver comprising an antenna to be located on the vehicle at a site, wherein each tire pressure signal has an amplitude and, for each tire location, the amplitude has a unique pattern over time for the antenna site. The system still further comprises a controller for mounting on board the vehicle, the controller to be provided in communication with the receiver for collecting and processing the tire pressure signals to automatically identify the tire locations associated therewith based on the unique amplitude patterns, the controller further for generating control signals for use in conveying tire pressure and location information to a vehicle occupant According to the present invention, a method is also provided for monitoring tire pressure in a vehicle having a plurality of tires, each tire having a tire location associated therewith. The method comprises providing a plurality of tire monitors, each monitor for mounting in one of the plurality of tires, each monitor comprising means for determining tire pressure and a transmitter for transmitting a signal representative of the tire pressure determined. The method further comprises providing a receiver for mounting on board the vehicle for receiving the tire pressure signals, the receiver comprising an antenna to be located on the vehicle at a site, wherein each tire pressure signal has an amplitude and, for each tire location, the amplitude has a unique pattern over time for the antenna site. The method still further comprises providing a controller for mounting on board the vehicle, the controller to be provided in communication with the receiver for collecting and processing the tire pressure signals to automatically identify the tire locations associated therewith based on the unique amplitude patterns, the controller further for generating control signals for use in conveying tire pressure and location information to a vehicle occupant.

These and other features and advantages of the present invention will be readily apparent upon consideration of the following detailed description of the invention in conjunction with the accompanying drawings.

BRIEF DESCRIPTION OF DRAWINGS

FIG. 2 is a simplified, representative flowchart concerning pattern recognition and automatic identification of tire location according to the system and method of the present invention.

BEST MODE FOR CARRYING OUT THE INVENTION

Figure 1:
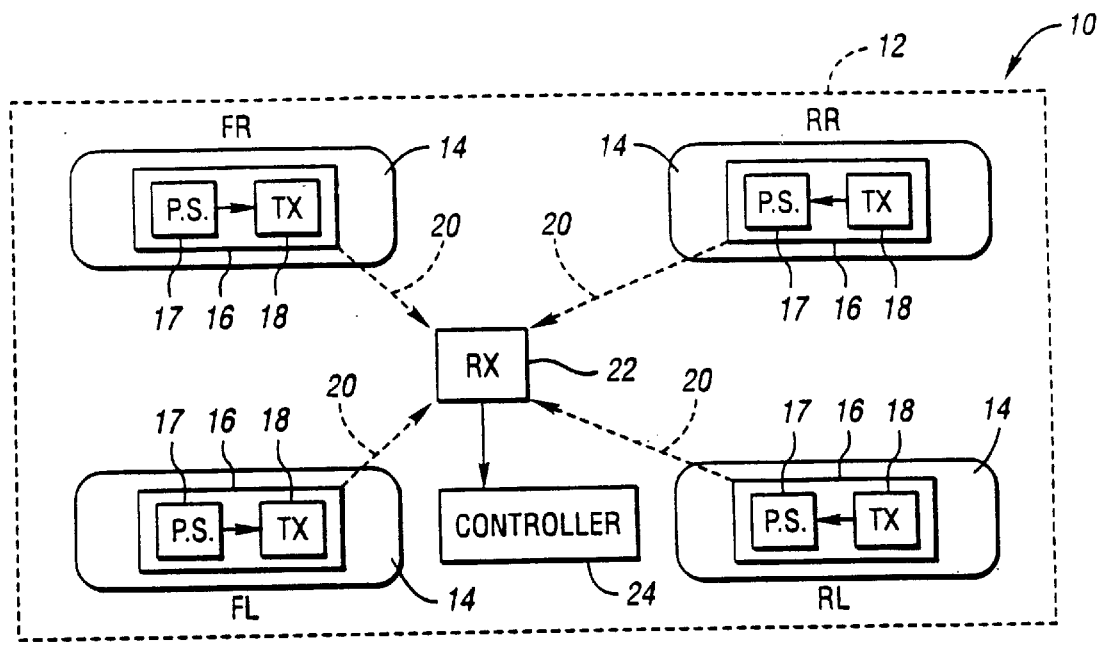
FIG. 1 is a simplified, representative block diagram of the tire pressure monitoring system of the present invention.
Figure 3:
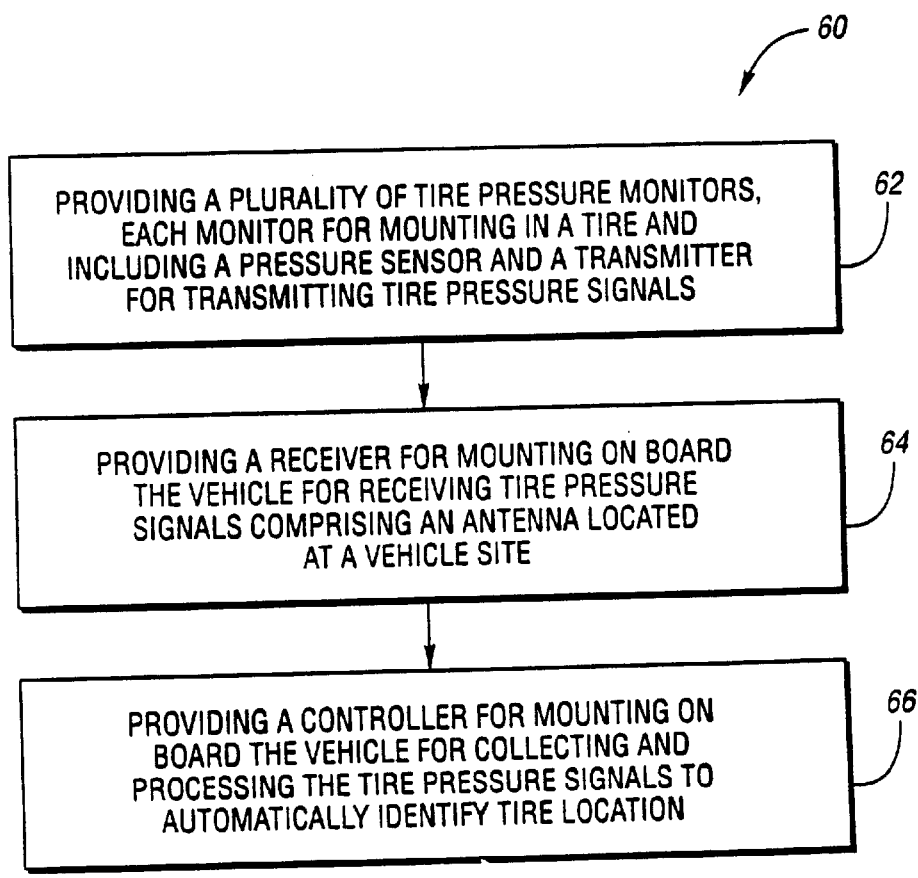
FIG. 3 is a simplified, representative flowchart of the tire pressure monitoring method of the present invention.

Referring to FIGS. 1–3, the preferred embodiment of the present invention will now be described. As previously noted, it is known in the automotive industry to provide for wireless monitoring of vehicle tire parameters, particularly tire pressure. In such known tire pressure monitoring systems, tire pressure sensors and radio frequency (RF) transmitters are mounted inside each tire, typically adjacent the inflation valve stem. In each tire, the tire pressure sensed by the tire pressure sensor is transmitted by the transmitter to a receiver located on-board the vehicle. The tire pressure information delivered to the receiver by the RF signals from the transmitters is subsequently conveyed to a vehicle operator or occupant, typically in the form of a display.

Conventional tire pressure monitoring systems, however, are not capable of automatically recognizing the particular tire location (e.g., front left (FL), front right (FR), rear left (RL), rear right (RR)) associated with an RF signal received from a tire transmitter without the use of additional equipment or devices. That is, in many conventional tire pressure monitoring systems, in order to provide a vehicle operator with information specific to each vehicle tire, an initialization or sign-up operation must be undertaken by a technician or vehicle owner to program the system so that each RF signal from a tire transmitter will be associated with a particular tire location.

Such operation, however, can create problems when tires are rotated. Each time the vehicle tires are rotated, such initialization must be repeated to ensure that the system continues to operate properly by conveying accurate information, including tire location, to the vehicle operator. This initialization requirement makes tire rotation more complex, and increases the possibility of inaccurate operation of the system. These problems can be overcome through the use of additional equipment or devices, as previously mentioned, for use in determining tire locations. For example, multiple antenna, each associated with a particular tire, and/or specialized transmitters may be employed. Such additional equipment or devices, however, can add significant cost to a tire pressure monitoring system.

Thus, as also previously noted, there exists a need for an adaptive or smart tire pressure monitoring system and method that automatically recognizes tire location even after tire rotation, without the need for subsequent initialization or sign-up operations, or additional equipment or devices. In that regard, the amplitude and pattern of a tire pressure signal transmitted from a rotating tire typically vary during transmission. The tire pressure monitoring system and method of the present invention use signal amplitude over time from tire transmitters as a signature for each tire location. The system and method preferably include a receiver optimally located on the vehicle, as well as a microcontroller or digital signal processor (DSP) for collecting amplitude versus time data from each tire transmitter and processing such data using pattern recognition techniques to determine the tire location from where the data was transmitted. Advantageously, tire pressure sensor identification codes and such a location signature may be combined to provide the vehicle operator with tire location information.

Referring now to FIG. 1, a simplified, representative block diagram of the tire pressure monitoring system of the present invention is shown, denoted generally by reference numeral 10. As seen therein, the system (10) is designed for use in a vehicle (12) having a plurality of tires (14). Each one of the plurality of tires (14) has a tire location associated therewith, such as front left (FL), front right (FR), rear left (RL), and rear right (RR). It should be noted here that while the present invention is described herein for use in an automotive vehicle having four tires, such an environment is exemplary only. That is, the present invention is suitable for use in any type of vehicle having any number of tires.

Still referring to FIG. 1, the system (10) includes a plurality of tire monitors (16). Each tire monitor (16) is provided for mounting in one of the plurality of tires (14). In that regard, each tire monitor (16) is preferably located inside the tire (14) adjacent the tire inflation valve stem (not shown), although any mounting location known in the art may be used. Each tire monitor (16) includes means, preferably an appropriate sensor (17) and/or other devices (not shown), for sensing, determining and/or monitoring at least the pressure of the associated tire (14). It should be noted, however, that each tire monitor (16) may also be equipped to sense, determine and/or monitor any number of tire parameters in addition to pressure including, but not limited to, temperature, status (i.e., whether or not the tire is rotating) and/or speed, in any fashion well known to those of ordinary skill in the art.

Each tire monitor (16) also includes a transmitter (18) in communication with sensor (17) for transmitting a tire pressure signal (20) representative of the sensed tire pressure. In that regard, tire pressure signal (20) is preferably a radio frequency (RF) signal, although other signal types known in the art could be employed. Once again, it should be noted that transmitter (18) may also transmit, as part of or separate from tire pressure signal (20), a signal or signals representative of information concerning any of a number of other tire parameters in addition to pressure such as temperature, status and/or speed as sensed, measured and/or determined by an appropriately equipped tire monitor (16). As will be described in greater detail below, such tire pressure information, together with information concerning any other tire parameters, is ultimately conveyed to a vehicle operator, typically via a visual display, although audible means such as tones or speech may also be used.

Referring still to FIG. 1, the tire pressure monitoring system (10) of the present invention also includes a receiver (22) for mounting on-board the vehicle (12) for receiving the tire pressure signals (20) transmitted by transmitters (18). Receiver (22) comprises one or more antenna (not shown), each provided to be located at one or more selected sites on the vehicle (12). As will be described in greater detail below, such sites are determined empirically for each vehicle type as optimal sites for use according to the present invention in automatically determining a tire location associated with each tire pressure signal (20) received from transmitters (18).

Receiver (22) also comprises a receiver housing (not shown). The one or more antenna that are part of receiver (22) may either be integrated inside the receiver housing, located external to the housing, or both. As is readily apparent, if one or more of the antenna are integrated inside the receiver housing, then receiver (22) is also located on the vehicle at an optimal site for the one or more antenna. Alternatively, if the one or more antenna are located external to the receiver housing, then receiver (22) may be located at a different site on the vehicle than the one or more antenna. In such an embodiment, with the one or more antenna located external to the receiver housing, receiver (22) could be located at a similar vehicle site on any type of vehicle in which the present invention is employed.

Still referring to FIG. 1, the system (10) of the present invention further comprises a controller (24) for mounting on-board vehicle (12) and to be provided in communication with receiver (22). Controller (24) is for collecting or sampling, for selected durations of time, tire pressure signals (20) received by receiver (22) from transmitters (18), and for processing such tire pressure signals (20) to automatically identify the tire location associated with each tire pressure signal (20). Controller (24) is also for generating control signals (not shown) for use in conveying at least tire pressure and location information to a vehicle operator, typically via a display unit (not shown), such as an LED display or a lighted icon in the vehicle dashboard or a vehicle console. Once again, as described above, information concerning other tire parameters, such as temperature, status and/or speed, may also be conveyed to the vehicle operator. It should be noted that the information may also be conveyed to the vehicle operator in an audible fashion, and may include a warning, which may also be audible, if tire pressure and/or other tire parameters, such as temperature, are outside recommended ranges.

As noted above, to determine tire locations based on the amplitude patterns over time of the tire pressure signals (20), controller (24) collects or samples tire pressure signals (20) received by receiver (22) from transmitters (18) for selected durations of time. In that regard, the signal amplitude patters over time of the tire pressure signals (20) also vary depending on vehicle speed. As a result, vehicle speed information is preferably also provided to controller (24), such as in the form of a signal from the vehicle speedometer (not shown) transmitted to controller (24), for use by the controller (24) in identifying tire locations. As also previously noted, controller (24) is preferably a microcontroller or DSP which performs the functions described above concerning identifying tire locations, and conveying tire location and pressure information to a vehicle occupant, possibly along with information concerning other tire parameters, such as temperature, status and/or speed.

Referring still to FIG. 1, each pressure sensor (17) preferably has an identification code associated therewith. Such sensor identification codes serve to particularly associate sensors (17) with vehicle (12). As a result, such pressure sensor identification codes and the tire location signature described above can be advantageously combined to provide the vehicle operator with tire location information. In that regard, each transmitter (18) also preferably transmits the sensor identification code of its associated sensor (17) for receipt by receiver (22) and for use by controller (24) in verifying that the tire pressure signals (20) received by receiver (22) are associated with the vehicle (12). Transmitters (18) may transmit the sensor identification codes as part of tire pressure signal (20), or as a separate signal (not shown). In such a fashion, controller (24) disregards any tire pressure signals which may be transmitted from any nearby vehicle and received by receiver (22).

As is well known in the art, each transmitter (18) is preferably powered by a suitable battery (not shown). As a result, to extend battery life, rather than transmit tire pressure signals (20) continuously, each transmitter (18) transmits its tire pressure signal (20) intermittently according to a period. In that regard, the particular period employed for such transmissions is not critical, and may be the same for each transmitter (18), or may differ from transmitter (18) to transmitter (18). Additionally, the period may be fixed, or may vary in any fashion, including specific or random periods. In any event, as noted above, periodic transmission of tire pressure signals (20) by transmitters (18) provides for extended battery life. It should also be noted that, for the same purpose, tire pressure signals (20) may be transmitted periodically by transmitters (18) only when the tires (14) are in motion, or only when the rotational speed of the tires (14) exceeds a selected threshold.

In addition, because the transmitters (18) transmit tire pressure signals (20) periodically, and that period may vary, a protocol is preferably established whereby each transmitter (18) further transmits a signal for receipt by receiver (22) in order to notify controller (24) when the transmitter (18) will transmit tire pressure signals (20) from which the controller can identify the tire location associated with that transmitter (18) and tire pressure signal (20). Such a signal, which may be referred to as a protocol signal, may be a part of or separate from the tire pressure signals (20), and may be transmitted a single time or periodically by a transmitter (18), depending upon the period for transmission of tire pressure signals (20) by a transmitter (18). Such a protocol signal may also notify controller (24) of the time for the next transmission of a tire pressure signal (20), or the times for any number of upcoming transmissions of tire pressure signals (20). In any event, such protocol signals are for use by the controller (24) in determining the periods according to which the transmitters (18) will transmit tire pressure signals (20).

Such a protocol signal may also notify controller (24) of the length or time span of the tire pressure signal (20) that a transmitter (18) will be transmitting. In that regard, as noted above, controller (24) collects or samples tire pressure signals (20) received by receiver (22) from transmitters (18) for selected durations of time. As a result, each tire pressure signal (20) has a time span sufficient for controller (24) to collect data from the tire pressure signal for the duration required. That is, each tire pressure signal (20) has a time span at least as great as the time duration required by controller (24) for collecting the tire pressure signals (20) so that controller (24) can process the tire pressure signal (20) to identify the tire location associated therewith.

As noted above, the amplitude and amplitude pattern of a tire pressure signal (20) transmitted by a transmitter (18) located in a rotating tire (14) typically vary during transmission. Such variations may be caused by a number of factors, which can include the type of tire (14). In addition, as also previously noted, the amplitude and amplitude patterns of a tire pressure signal (20) also vary depending on vehicle speed. Moreover, the different directions from which the individual tire pressure signals (20) approach the one or more antenna (not shown) of receiver (22), and the different vehicle structures along the paths of such transmissions (such as due to different vehicle options) also cause the amplitudes and amplitude patterns of the individual tire pressure signals (20) to differ from each other. As a result, at least one optimal site can be determined empirically for any vehicle or vehicle type where the one or more antenna of receiver (22) may be located such that, for any given vehicle speed, the amplitude pattern over time of each tire pressure signal (20) is unique upon receipt. As those of ordinary skill in the art will appreciate, optimal sites may be different for different vehicles and/or vehicle types.

In such a fashion, each tire pressure signal (20) can be associated with a different tire location. That is, the signal amplitude patterns over time for each tire pressure signal (20) can be used as a unique signature for each tire location. Based on the unique amplitude patterns over time for each of the tire pressure signals (20), controller (24) automatically identifies the location of the tire (14) (e.g., front left (FL), front right (FR), rear left (RL), rear right (RR)) associated therewith. Thus, even after the tires (14) are rotated to new locations, the tire pressure signal (20) transmitted from the transmitter (18) in the tire (14) at the front left (FL) tire location, for example, will exhibit the same amplitude patterns over time at the same vehicle speeds as had the previous tire pressure signal (20) transmitted from the transmitter (18) in the tire (14) previously located at that front left (FL) tire location prior to tire rotation. This is due to the vehicle site of the one or more antenna of receiver (22) and the resulting position of the one or more antenna relative to the transmitters (18) in each of the tires (14) at the various tire locations (e.g., front left (FL), front right (FR), rear left (RL), rear right (RR)). As previously described, the vehicle site of the one or more antenna results in different directions from which the tire pressure signals (20) from each tire location approach the one or more antenna, and different vehicle structures along the paths of transmission for the tire pressure signals (20) transmitted from each tire location by transmitters (18). As is readily apparent then, transmitters (18) may be identical, and need not be specially programmed or adapted so that tire location information can be determined.

Still referring to FIG. 1, controller (24) is provided with a learning or programming mode for initially teaching controller (24) the locations of tires (14) after installation of the transmitters (18), receiver (22) and controller (24) in the tires (14) and on board the vehicle (12), such as on an assembly line or a manufacturing floor. In such a programming mode, the controller (24) is provided by a technician with the identity of a particular tire location (e.g., front left (FL)) in any known fashion. A tire pressure signal (20) is transmitted from the transmitter (18) associated with that tire location (FL) while the tire (14) associated with that tire location (FL) rotates, preferably through at least one full 360° revolution. Receiver (22) receives that tire pressure signal (20) at the antenna site (not shown). Controller (24) collects and processes that tire pressure signal (20) so that the amplitude pattern of that tire pressure signal (20) is associated with the tire location (FL) provided. In that regard, controller (24) preferably collects tire pressure signal (20) for one or more selected windows or durations of time, which may be of any length. The amplitude pattern of tire pressure signal (20) over that time may be stored in a memory accessible by controller (24), such as a ROM where controller (24) takes the form of a microcontroller or DSP. Alternatively, tire pressure signal (20) could be collected over multiple windows, and an amplitude pattern determined by computing the average of the peak amplitudes from the multiple windows. Such an amplitude pattern could again be stored in a memory accessible by controller (24). This procedure is repeated for each tire location.

Having been initially programmed with the tire locations associated with each of the tire pressure signals, controller (24) thereafter collects and processes tire pressure signals (20) transmitted by the transmitters (18) from each of the tire locations at one or more vehicle speeds during vehicle operation (i.e., when tires (14) are rotating). As previously noted, controller (24) is preferably provided with vehicle speed information, such as in the form of a signal supplied to controller (24) from the vehicle speedometer (not shown). In such a fashion, controller (24) learns how the unique amplitude pattern over time for each tire location varies depending on vehicle speed. Just as described above, controller (24) preferably collects such tire pressure signals (20) for one or more selected windows of time, which again may be of any length. The amplitude patterns of the tire pressure signals (20) at various vehicle speeds again may be stored in a memory accessible by controller (24). Alternatively, an amplitude pattern determined by computing the average peak amplitude of a tire pressure signal (20) for a set of windows in which the tire pressure signal (20) was collected could also be stored in a memory accessible by controller (24).

It can thus be seen that the present invention automatically identifies tire location based on signal amplitude (which may also be referred to as received signal strength) levels, time and rotational information factors. For example, based on the amplitude pattern of a tire pressure signal (20) over a selected time duration transmitted while the associated tire (14) rotates, the present invention automatically identifies the tire location associated therewith even after the tires (14) have been rotated or changed to new locations on the vehicle (12).

It should also be noted that while the adaptive nature of the system and method of the present invention described above is preferred, a pre-programmed or fixed system and method could alternatively be employed. That is, rather than learning amplitude patterns for each tire location in an initial programming mode and/or at various vehicle speeds during vehicle operation, amplitude patterns gathered for each tire location at various speeds in a controlled environment could be pre-programmed into a memory accessible by controller (24). During vehicle operation, the amplitude pattern of a collected tire pressure signal (20) would then be compared to one or more pre-programmed signature amplitude patterns for the various tire locations for use in identifying the tire location associated with that tire pressure signal (20) in a similar fashion to that previously described.

Referring next to FIG. 2, a simplified, representative flowchart concerning pattern recognition and automatic identification of tire location according to the system and method of the present invention is shown. As seen therein, at least one time duration ($t_d$) and vehicle speed (v) are determined (30, 32) for collecting a tire pressure signal. Thereafter, collection (34) of a tire pressure (TP) signal begins, and continues until the time during which the tire pressure signal has been collected ($t_c$) equals or exceeds (36) the time duration ($t_d$). As noted above, any number of time durations or windows could be used, which may be of any length. As also previously described, collection of tire pressure signals can also be undertaken at any vehicle speed, including multiple speeds.

Next, it may be determined (38) if the pressure sensor identification (ID) associated with the tire pressure signal indicates that the tire pressure signal is one associated with the vehicle. If not, no further action is taken (40). If so, then the amplitude pattern of the collected tire pressure signal is analyzed using known pattern recognition techniques to determine (42, 44, 46, 48) if it matches any of the stored signature amplitude patterns (P1, P2, P3, P4) for the vehicle tire locations, given the vehicle speed or speeds at which the tire pressure signal was collected. In that regard, taking into account various discrepancies that may result due to road conditions, minor vehicle or tire structural variations over time, or other environmental conditions or factors, it is determined (42, 44, 46, 48) if the amplitude pattern of the collected tire pressure signal is sufficiently close to a stored signature amplitude pattern (P1, P2, P3, P4), given the vehicle speed, such that a tire location can be positively identified. Once again, as previously described, such analysis could include comparing the amplitude pattern of one or more collected tire pressure signals, which could include the amplitude pattern determined by calculating the average of the peak amplitudes of a tire pressure signal collected over multiple windows, to a similar type of stored signature amplitude pattern.

If such pattern recognition analysis results in a match, a vehicle tire location (T) is identified (50, 52, 54, 56) based on the particular tire location (e.g., FL, FR, RL, RR) associated with that signature. If not, the procedure may be repeated. If a tire location (T) has been identified (50, 52, 54, 56), then such tire location (T) information, along with at least tire pressure (TP) information, is conveyed (58) to a vehicle occupant. Once again, other information, such as temperature, speed and/or status may also be conveyed to the vehicle occupant, and may be conveyed via a display, by audible means, or both.

Referring next to FIG. 3, a simplified, representative flowchart of the tire pressure monitoring method of the present invention is shown, denoted generally by reference numeral 60. The method (60) is for use in a vehicle having a plurality of tires, each tire having a tire location associated therewith. As seen in FIG. 3, the method (60) comprises providing (62) a plurality of tire pressure monitors, each monitor for mounting in one of the plurality of tires, each monitor including a pressure sensor for sensing tire pressure and a transmitter for transmitting a tire pressure signal representative of the sensed tire pressure, and providing (64) a receiver for mounting on board the vehicle for receiving the tire pressure signals, the receiver comprising an antenna to be located at a vehicle site, wherein each tire pressure signal has an amplitude and, for each tire location, the amplitude has a unique pattern over time for the antenna site. The method further comprises providing (66) a controller for mounting on board the vehicle, the controller to be provided in communication with the receiver for collecting and processing the tire pressure signals to automatically identify the tire location associated with each tire pressure signal based on the unique amplitude patterns, the controller further for generating control signals for use in conveying tire pressure and location information to a vehicle occupant.

As previously described, the receiver provided comprises a receiver housing and one or more antenna that may be integrated inside or located external to the receiver housing, and which are located at one or more optimal sites on the vehicle in the fashion described above. Each tire pressure monitor is preferably located inside the tire adjacent the tire inflation valve stem, and includes an appropriate sensor and/or other devices for monitoring at least the pressure of the associated tire, as described above. In that regard, as also described above, each tire pressure monitor may also be equipped to monitor any number of tire parameters in addition to pressure including, but not limited to, temperature, status and/or speed, in any fashion well known to those of ordinary skill in the art.

As also describe previously, the controller provided is preferably a microcontroller or a DSP for performing the functions described in detail above concerning identifying tire locations, and conveying such tire location information to a vehicle occupant, along with at least tire pressure information. As also described in detail above, each pressure sensor preferably has an identification code which serves to particularly associate the sensor with the vehicle. As a result, such pressure sensor identification codes and the tire location signature described above can be advantageously combined to provide the vehicle operator with tire location information. To extend transmitter battery life, each transmitter preferably transmits its tire pressure signal intermittently according to a period, as described above in detail. A protocol signal may also be transmitted by each transmitter in order to notify the controller when the transmitter will transmit tire pressure signals and/or the time span of the tire pressure signal that a transmitter will be transmitting, as also described in detail above.

From the foregoing description, it can be seen that the present invention provides an improved system and method for tire pressure monitoring. More particularly, the present invention provides a system and method that automatically recognize tire location even after tire rotation, without the need for subsequent initialization or sign-up operations, or additional equipment or devices. The tire pressure monitoring system and method of the present invention use signal amplitude over time from tire transmitters as a signature for each tire location. The system and method preferably include a receiver optimally located on the vehicle, as well as a microcontroller or DSP for collecting amplitude versus time data from each tire transmitter and processing such data, using pattern recognition techniques, to determine the tire location from where the data was transmitted. Advantageously, tire pressure sensor identification codes and such a location signature can be combined to provide the vehicle operator with tire location information.

While various embodiments of the invention have been illustrated and described, it is not intended that these embodiments illustrate and describe all possible forms of the present invention. Rather, the words used in the specification are words of description rather than limitation, and it is understood that various changes may be made without departing from the spirit and scope of the invention. Indeed, many alternatives, modifications, and variations will be apparent to those skilled in the art in light of the foregoing description, and the present invention is intended to embrace all such alternatives.

What is claimed is:

1. In a vehicle having a plurality of tires, each tire having a tire location associated therewith, a system for monitoring tire pressure comprising:

a plurality of tire monitors, each monitor for mounting in one of the plurality of tires, each monitor comprising means for determining tire pressure and a transmitter for transmitting a signal representative of the tire pressure determined;

a receiver for mounting on board the vehicle for receiving the tire pressure signals, the receiver comprising an antenna to be located on the vehicle at a site, wherein each tire pressure signal has an amplitude and, for each tire location, the amplitude has a unique pattern over time for the antenna site without regard to a data encoding scheme for the tire pressure signal; and a controller for mounting on board the vehicle, the controller to be provided in communication with the receiver for collecting and processing the tire pressure signals to automatically identify the tire locations associated therewith based on the unique amplitude patterns, the controller further for generating control signals for use in conveying tire pressure and location information to a vehicle occupant.

2. The system of claim 1 wherein each means for determining tire pressure comprises a pressure sensor, the sensor having an identification associated therewith, and each transmitter is also for transmitting the sensor identification of the associated pressure sensor for receipt by the receiver and for use by the controller in identifying the tire pressure signals as associated with the vehicle.

3. The system of claim 1 wherein the receiver further comprises a receiver housing and the antenna is integrated inside the receiver housing.

4. The system of claim 1 wherein the receiver further comprises a receiver housing and the antenna is external to the receiver housing so that the receiver housing can be located at a different vehicle site than the antenna.

5. In a vehicle having a plurality of tires, each tire having a tire location associated therewith, a system for monitoring tire pressure comprising:

a plurality of tire monitors, each monitor for mounting in one of the plurality of tires, each monitor comprising means for determining tire pressure and a transmitter for transmitting a signal representative of the tire pressure determined;

a receiver for mounting on board the vehicle for receiving the tire pressure signals, the receiver comprising an antenna to be located on the vehicle at a site, wherein each tire pressure signal has an amplitude and, for each tire location, the amplitude has a unique pattern over time for the antenna site; and a controller for mounting on board the vehicle, the controller to be provided in communication with the receiver for collecting and processing the tire pressure signals to automatically identify the tire locations associated therewith based on the unique amplitude patterns, the controller further for generating control signals for use in conveying tire pressure and location information to a vehicle occupant, wherein the amplitude patterns of the tire pressure signals vary depending on vehicle speed, and the controller is further to be provided with vehicle speed information so that, for each tire location, a stored amplitude pattern of the tire pressure signal at a vehicle speed can be used in identifying the tire location.

6. The system of claim 1 wherein each transmitter includes a battery and, to extend battery life, each transmitter transmits tire pressure signals intermittently according to a period.

7. The system of claim 6 wherein the periods may vary.

8. The system of claim 6 wherein each transmitter further transmits a protocol for receipt by the receiver, the protocol for use by the controller in determining the periods according to which the transmitters will transmit tire pressure signals.

9. The system of claim 1 wherein the controller is provided with a initial programming mode for the tire locations, the programming mode comprising, for each tire location, providing the controller with the tire location, transmitting a tire pressure signal from the transmitter associated with the tire location while the tire associated with the tire location rotates, receiving the tire pressure signal at the antenna site, and collecting and processing the tire pressure signal so that the amplitude pattern of the tire pressure signal is associated with the tire location provided.

10. The system of claim 9 wherein the amplitude patterns of the tire pressure signals vary depending on vehicle speed and the controller is further to be provided with vehicle speed information, and wherein, for each tire location, the controller is further for storing an amplitude pattern of the tire pressure signal for at least one vehicle speed for use in identifying the tire location.

11. In a vehicle having a plurality of tires, each tire having a tire location associated therewith, a method for monitoring tire pressure comprising:

providing a plurality of tire monitors, each monitor for mounting in one of the plurality of tires, each monitor comprising means for determining tire pressure and a transmitter for transmitting a signal representative of the tire pressure determined;

providing a receiver for mounting on board the vehicle for receiving the tire pressure signals, the receiver comprising an antenna to be located on the vehicle at a site, wherein each tire pressure signal has an amplitude and, for each tire location, the amplitude has a unique pattern over time for the antenna site without regard to a data encoding scheme for the tire pressure signal; and providing a controller for mounting on board the vehicle, the controller to be provided in communication with the receiver for collecting and processing the tire pressure signals to automatically identify the tire locations associated therewith based on the unique amplitude patterns, the controller further for generating control signals for use in conveying tire pressure and location information to a vehicle occupant.

12. The method of claim 11 wherein each means for determining tire pressure comprises a pressure sensor, the sensor having an identification associated therewith, and each transmitter is also for transmitting the sensor identification of the associated pressure sensor for receipt by the receiver and for use by the controller in identifying the tire pressure signals as associated with the vehicle.

13. The method of claim 11 wherein the receiver further comprises a receiver housing and the antenna is integrated inside the receiver housing.

14. The method of claim 11 wherein the receiver further comprises a receiver housing and the antenna is external to the receiver housing so that the receiver housing can be located at a different vehicle site than the antenna.

15. The method of claim 11 wherein the amplitude patterns of the tire pressure signals vary depending on vehicle speed, and the controller is further to be provided with vehicle speed information so that, for each tire location, a stored amplitude pattern of the tire pressure signal at a vehicle speed can be used in identifying the tire location.

16. The method of claim 15 wherein each transmitter includes a battery and, to extend battery life, each transmitter transmits tire pressure signals intermittently according to a period.

17. The method of claim 16 wherein the periods may vary.

18. The method of claim 17 wherein each transmitter further transmits a protocol for receipt by the receiver, the protocol for use by the controller in determining the periods according to which the transmitters will transmit tire pressure signals.

19. The method of claim 11 wherein the controller is provided with a initial programming mode for the tire locations, the programming mode comprising, for each tire location, providing the controller with the tire location, transmitting a tire pressure signal from the transmitter associated with the tire location while the tire associated with the tire location rotates, receiving the tire pressure signal at the antenna site, and collecting and processing the tire pressure signal so that the amplitude pattern of the tire pressure signal is associated with the tire location provided.

20. The method of claim 19 wherein the amplitude patterns of the tire pressure signals vary depending on vehicle speed and the controller is further to be provided with vehicle speed information, and wherein, for each tire location, the controller is further for storing an amplitude pattern of the tire pressure signal for at least one vehicle speed for use in identifying the tire location.

\* \* \* \* \*